United States Patent [19]

Zavis et al.

[11] Patent Number: 4,527,101

[45] Date of Patent: Jul. 2, 1985

[54] UNIVERSAL ELECTRIC MOTOR SPEED SENSING BY USING FOURIER TRANSFORM METHOD

[75] Inventors: Wayne Zavis, Randallstown; David A. Saar, Timonium, both of Md.

[73] Assignee: Black & Decker Inc., Newark, Del.

[21] Appl. No.: 554,571

[22] Filed: Nov. 23, 1983

[51] Int. Cl.³ ............... G06F 15/332; H02K 23/64
[52] U.S. Cl. .................... 318/245; 364/726; 324/161; 318/312; 318/490
[58] Field of Search ............. 318/331, 490, 245, 312; 324/161, 166, 177, 77 B; 364/725, 726

[56] References Cited

U.S. PATENT DOCUMENTS

| | | | |
|---|---|---|---|
| 3,638,004 | 1/1972 | Sloane et al. | 364/726 |
| 3,675,126 | 7/1972 | Chilton | 324/177 X |
| 3,775,653 | 11/1973 | Peterson et al. | 318/326 |
| 3,805,034 | 4/1974 | Klein et al. | 324/166 X |
| 3,970,935 | 7/1976 | Beery et al. | 324/166 |
| 4,057,756 | 11/1977 | Ley et al. | 324/77 B |
| 4,080,661 | 3/1978 | Niwa | 364/726 |
| 4,275,452 | 6/1981 | White | 364/726 |
| 4,296,374 | 10/1981 | Henry | 324/77 B |
| 4,319,329 | 3/1982 | Girgis et al. | 364/484 |
| 4,358,734 | 11/1982 | Elfner et al. | 318/312 |

OTHER PUBLICATIONS

Ro, Bentsu; Dissertation, University Microfilms International, Ann Arbor, Michigan, 1983, p. 35.
IEEE Communications, "The Discrete Fourier Transform Applied to Time Domain Signal Processing", vol. 20, No. 3, pp. 13–22, May 1982.
Ibid, "Time Domain Modeling and Digital Simulation of Variable-Freq. A.C. Motor Speed Control Using PLL Technique", vol. IA-19, No. 2, Mar./Apr. 1983, pp. 174–180.

Primary Examiner—S. J. Witkowski
Assistant Examiner—Bentsu Ro
Attorney, Agent, or Firm—Ronald Sherer; Harold Weinstein; Edward D. Murphy

[57] ABSTRACT

An indirect speed sensor for an electric motor, such as an electric motor of the universal type, provides for a resistive element in series with the motor windings so that current pertubations that occur as a consequence of armature rotation are manifested as speed-dependent voltage signals across the resistive element. The voltage signals are amplified and filtered to remove frequency components above and below the expected signal spectrum and then provided to an analog-to-digital converter that converts the filtered analog signal to digital values that are stored in a memory. A stored-program controlled microprocessor analyzes the stored digital information by performing a fast Fourier transform to provide an equivalent amplitude spectrum. The maximum amplitude spectral component is then identified to determine the speed of the motor.

4 Claims, 7 Drawing Figures

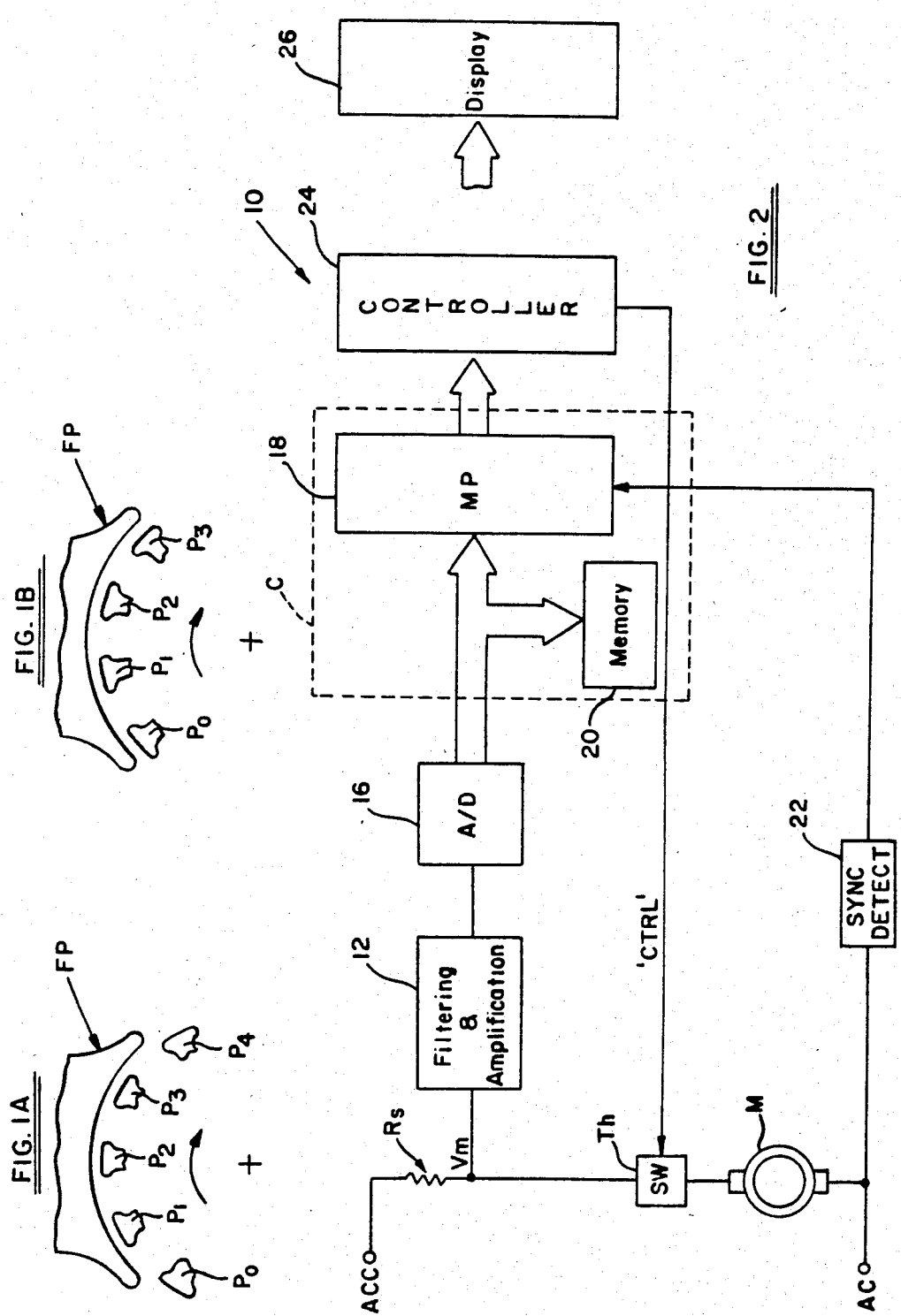

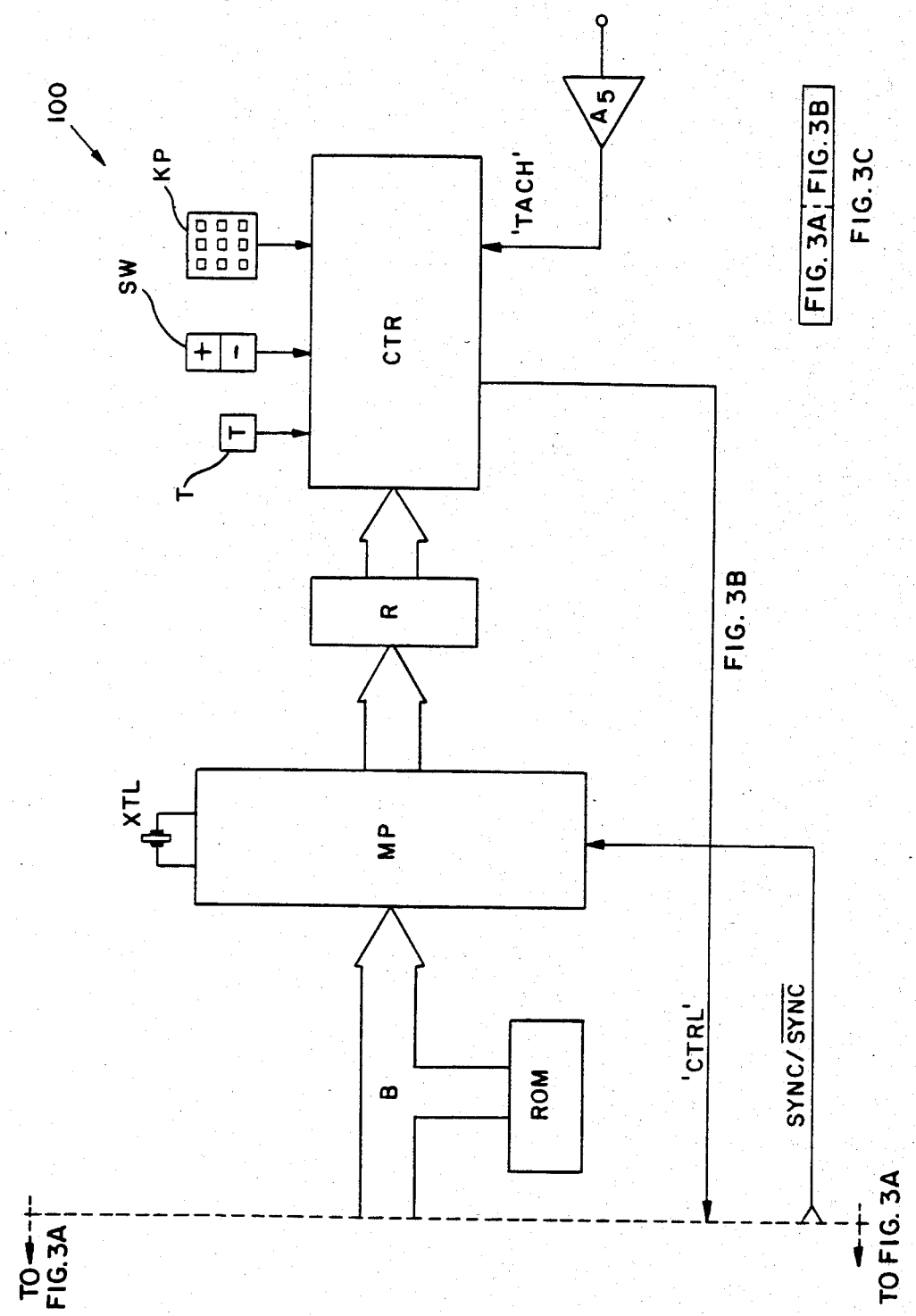

4,527,101

UNIVERSAL ELECTRIC MOTOR SPEED SENSING BY USING FOURIER TRANSFORM METHOD

BACKGROUND OF THE INVENTION

1. Field of the Invention

The present invention relates to apparatus and method for sensing the speed of an electric motor and, more particularly, to an apparatus and method for indirectly sensing the speed of an universal electric motor.

2. Description of the Prior Art

The rotational speed of electric motors has typically been sensed by either direct or indirect techniques. With the direct speed sensing technique, a discrete sensor that provides an analog or digital output is operatively coupled to the motor. Discrete sensors have included tachometer-generators that provide an analog output or pick-off transducers. The pick-off transducers have included photoelectric pick-offs that cooperate with an apertured speed wheel or magnetic pick-offs that cooperates with a toothed or cogged wheel. As the apertured or toothed wheel passes through the cooperating pick-off, a digital pulse train is generated having a pulse repetition rate that is proportional to the speed of the motor. Since the direct speed sensing approach requires a discrete sensor that is operatively connected to the motor, the motor package design must oftentimes be enlarged to accommodate the sensor. Also, the requirement for a discrete sensor adds to the piecepart count and the manufacturing, assembly, and maintenance costs of the motor. The indirect speed sensing technique does not use discrete sensors and, accordingly, obviates some of the drawbacks attendant to direct speed sensing. With the indirect speed sensing approach, speed dependent current or voltage perturbations in the motor winding circuit can be measured and processed to provide an analog or digital output signal that is representative of the motor speed. In processing the current or voltage perturbations, it is oftentimes difficult to distinguish and enhance the perturbations and discriminate them from other frequency components that may be present, including the supply power frequency components and commutation and brush noise frequency components, especially during those portions of the power supply waveform near the zero axis where the magnitude of current or voltage perturbations diminishes toward zero along with the supply power waveform.

As the control requirements for electric motors become more demanding, there is an increased need for reliable and accurate motor speed sensing devices and related motor controllers that have greater capability and flexibility in their applications than prior devices so that a single indirect speed sensor can be utilized in the control of a wide class of motors.

SUMMARY OF THE INVENTION

In view of the above, it is a board overall object of the present invention, among others, to provide a reliable and accurate method and apparatus for measuring the speed of an universal electric motor.

It is another object of the present invention to provide an apparatus for measuring the speed of an electric motor by indirect sensing techniques and to provide a speed sensor that is less expensive to manufacture and more compact than motor speed sensors of the type that utilize a discrete speed sensor.

It is still another object of the present invention to provide an apparatus that indirectly senses the speed of an electric motor by analyzing the frequency components present in the motor circuit using a Fourier transform to identify the maximum amplitude frequency component that is representative of the motor speed.

It is a further object of the present invention to provide an apparatus that indirectly senses the speed of an electric motor that utilizes circuit devices that are amenable to manufacture by integrated circuit fabrication techniques to provide an apparatus that provides the desired speed sensing function with a minimum parts count.

In accordance with these objects, and others, the present invention provides an indirect speed sensor and method for an electric motor in which current variations that recur in the motor winding circuit as a function of motor speed are sensed as voltage variations, filtered to remove unwanted frequency components above and below the range of expected frequencies for the motor, and provided to an analog-to-digital converter which converts the analog input to a digital output. A stored-program controlled microprocessor receives the digital information and functions as a digital signal processor to perform a fast Fourier transform on the digital information to generate the corresponding amplitude spectrum. The spectrum is searched to identify the highest amplitude spectral component to thereby identify the speed of rotation of the motor.

In the preferred embodiment, a resistive element is placed in circuit with the electric motor so that at least a portion of the current drawn by the electric motor passes through the resistive element to develop a voltage signal thereacross that is representative of the current flow through the motor circuit. Variations in the current drawn by the motor occur, in part, because the reluctance of the magnetic path defined between the field poles and the moving armature poles varies during armature rotation at a rate proportional to the armature speed. The resultant signal spectrum includes a frequency component representative of the motor's speed as well as frequency components representative of supply power, commutation, and brush noise. The signal output of the motor is presented to a signal processing path that preferably includes switched-capacitor filters that remove spectral components above and below the range of expected frequencies for the motor's speed range and an analog-to-digital converter that converts the filtered signal to corresponding digital values. A stored-program microprocessor performs a fast Fourier transform on the digital information and selects the highest amplitude spectral component as the motor's speed representative signal. The transform is accomplished using the butterfly technique by which the multiple iterations are performed to arrive at the desired result. In accordance with one aspect of the present invention, memory utilization and computational efficiency is increased by defining memory locations for the real and imaginary numbers and then storing only the real number components in the locations defined for both the real and imaginary values.

The indirect speed sensing circuit of the present invention provides for a method for processing a speed-dependent voltage signal to provide a digital signal output to a utilizing circuit, such as a motor speed control circuit, and an apparatus which is uniquely adaptable to fabrication by integrated circuit techniques to provide an indirect speed sensor having a low parts count and cost when compared to prior speed sensing arrangements, particularly those speed sensing arrangements that utilize a discrete sensor.

BRIEF DESCRIPTION OF THE FIGURES

FIG. 1A is a partial end view, in schematic form, of a field pole and armature of an exemplary electric motor showing three armature poles and four armature gaps opposite the field pole face;

FIG. 1B is a partial end view, also in schematic form, of the field pole and four armature poles and three armature gaps opposite the field pole;

FIG. 2 is a block diagram of the overall organization of an indirect speed sensor in accordance with the present invention;

FIG. 3B is a partial schematic block diagram of a second portion of the indirect speed sensing circuit of FIG. 2 including digital processing devices;

FIG. 3C is a legend indicating the manner in which FIGS. 3A and 3B are to be read.

DESCRIPTION OF THE PREFERRED EMBODIMENT

Figure 3A:
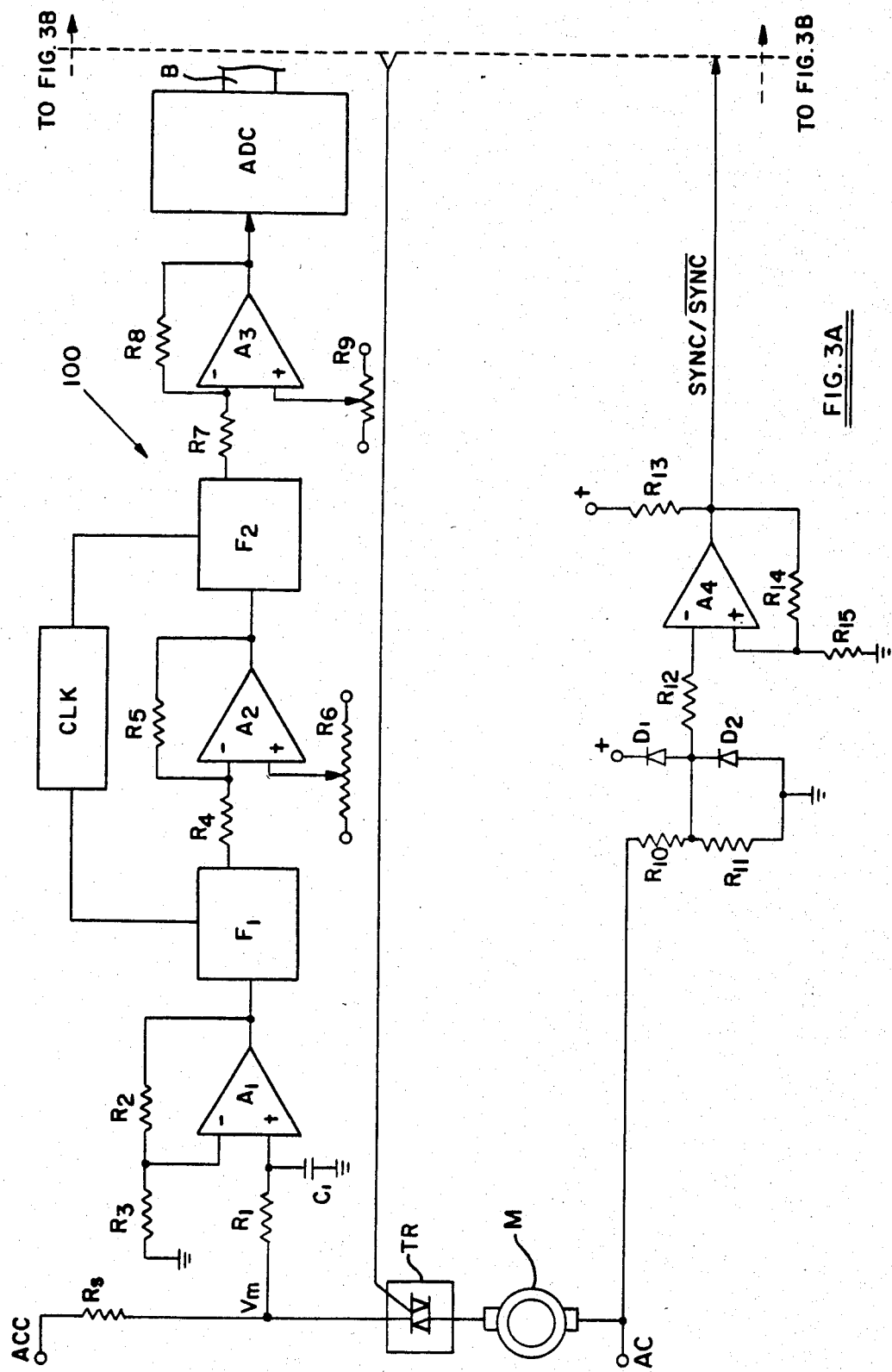
FIG. 3A is a partial schematic block diagram of the indirect speed sensing circuit of FIG. 2 and illustrates signal amplification and filtering devices.

A speed sensor and motor controller in accordance with the present invention for indirectly sensing the speed of an electric motor utilizes the current flow variations or perturbations developed in a motor circuit as a consequence of the armature rotation as an input signal source for determining the speed of the motor. FIGS. 1A and 1B illustrate the manner by which current flow variations are caused in the motor circuit as a consequence of armature rotation. FIG. 1A is a schematic representation of a field pole FP located adjacent to a schematically represented armature having equispaced armature poles $P_0$, $P_1$, $P_2$, $P_3$, and $P_4$ that pass sequentially beneath the field pole FP as the armature rotates, for example, in the direction of the arrow as shown. In FIG. 1A, three armature poles, that is, $P_1$, $P_2$, and $P_3$, are located directly beneath the field pole FP along with four inter-pole slots (unnumbered). The armature-to-field pole configuration of FIG. 1A represents a first reluctance value in the magnetic path defined between the field pole FP and the armature. FIG. 1B illustrates the armature-to-field pole configuration with the armature having rotated one-half slot in the indicated direction. As shown in FIG. 1B, four armature poles, that is, $P_0$, $P_1$, $P_2$, and $P_3$, and three inter-pole slots are shown beneath the field pole FP. The latter armature-to-field pole configuration of FIG. 1B represents a second reluctance value in the magnetic path defined between the field pole FP and its armature, this second reluctance value being less than that of the first reluctance value of FIG. 1A. Because of the variation in the number of armature poles P beneath the field pole FP during rotation of the armature, the amount of magnetic material beneath the field pole FP varies in accordance with armature rotation to vary the reluctance in the magnetic path between the field pole FP and the armature and to cause, in a recurring manner, variations or perturbations in the current drawn by the motor as a function of the armature rotational speed.

An indirect speed sensor in accordance with the present invention that utilizes the above-described recurring current variations is shown in the schematic block diagram of FIG. 2 and referred to therein by the reference character 10. A current sensing impedance in the form of a resistor $R_s$, or another suitable impedance device such as a current transformer, is placed in series circuit with a motor M so that the motor current passes through the sensing resistor $R_s$. As a consequence of the current flow through the resistor $R_s$, a voltage potential $V_m$ will develop across the resistor $R_s$ with the magnitude of the voltage $V_m$ dependent upon the value selected for the sensing resistor $R_s$ and the magnitude of the current flow therethrough. The voltage $V_m$ will vary as a function of the current variations therethrough caused by the speed dependent reluctance variations as the armature rotates. Supply power AC/ACC to the motor M is controlled by a switchable thyristor Th that is also in series circuit with the motor M.

The voltage $V_m$ is provided to an amplifier and filter 12 which effects voltage amplification of the signal and passes the frequency components in the range of frequencies expected for the range of motor speeds and blocks or at least greatly attenuates frequency components below and above the expected frequency range, these unwanted frequencies including the low frequency power supply frequency components, low frequency brush components, and high frequency commutation noise components. The filtered and amplified signal is provided to analog-to-digital converter 16 which converts the analog signal to digital words of selected bit width e.g., 8, 12 or 16 bits) with the numeric value of each successive digital word corresponding to the related analog value of speed-responsive signal $V_m$.

The digital output of the analog/digital converter 16 is supplied to a microcomputer C that includes a microprocessor 18 and associated memory 20. The microprocessor 18 is controlled, in part, by a sync detector 22 and associated timing and control logic that enables the speed determining function during a recurring valid-signal time "window" in the power supply waveform when reliable speed indicating signal is present to further enhance the operation of the speed sensor.

As described more fully below in relationship to FIGS. 3A, 3B and 4, the microprocessor 18, under the control of a stored program, evaluates the digital output of the analog-to-digital converter 16 and provides present motor speed information to a motor controller 24 and/or a motor speed display 26. The speed determining step is accomplished by performing a fast Fourier transform on the digital values to obtain the amplitude spectrum and then identifying the maximum value spectral component.

The motor speed information provided to the motor controller 24 is used to effect motor control by providing appropriate gate signals "CTRL" to the thyristor Th. In addition, the output of the microprocessor 18 can be provided to a display device 26 to provide an indication of motor speed.

A preferred embodiment of the present invention is shown in FIGS. 3A and 3B (as read in accordance with the legend of FIG. 3C) and is designated therein generally by the reference character 100. As shown, the sampling resistor $R_s$ and the triac TR are in series circuit with the motor M. The sensed voltage $V_m$ is presented to a signal processing path that includes a low-pass active filter defined by the amplifier $A_1$, a first filter $F_1$, a second amplifier $A_2$, a second filter $F_2$, a third amplifier $A_3$ and an analog-to-digital converter ADC. The signal filtering path is designed to pass an expected frequency spectrum for the range of motor speeds while attenuating frequencies above and below the desired or expected frequency spectrum. The attenuated frequencies include the supply power waveform, commutation noise, and brush noise.

The voltage signal $V_m$ is presented to the low pass active filter that includes amplifier $A_1$ with frequency cut-off and scaling determined in the usual manner by resistors $R_1$, $R_2$, and $R_3$ and capacitor $C_1$.

The output signal from the amplifier $A_1$ is presented to the input of a filter $F_1$ that is designed to pass frequencies above a selected frequency and attenuate those frequencies below that cutoff frequency. In the preferred embodiment, the filter $F_1$ is of the switched capacitor type such as the 5620 switched capacitor filter manufactured by the E. G. & G. Reticon Company of Sunnyvale, Calif. 94086. The filter $F_1$ is connected to a clock CLK which provides switching pulses at a selected multiple of the desired cut-off frequency of the filter. In the case of the disclosed embodiment, the clock CLK provides a 384 kHz output.

The output of the filter $F_1$ is provided to the amplifier $A_2$ defined by an inverting operational amplifier with the amplifier's gain and offset controlled in the usual manner by resistors $R_4$, $R_5$, and $R_6$. The gain bandwidth product of the amplifier $A_2$ can provide a measure of higher frequency attenuation that assists in attenuating the clock CLK frequency components impressed upon the filter $F_1$ output.

The output of the amplifier $A_2$ is provided to the second filter $F_2$ that is of the same type as the filter $F_1$ and functions in a similar manner. The output of the filter $F_2$ is provided to a post-filtering amplifier $A_3$ defined by an operational amplifier with gain and offset controlled by resistors $R_7$, $R_8$ and $R_9$.

Suitable operational devices for the amplifiers $A_1$, $A_2$ and $A_3$ include the LM324 manufactured by the National Semiconductor Company, Santa Clara, Calif. 95051.

The output of the amplifier $A_3$ is provided to the analog-to-digital converter ADC which operates in a conventional manner to convert the analog output of the amplifier $A_3$ to a multi-bit digital value. The sampling rate of the analog-to-digital converter ADC is at least twice that of the highest frequency expected in the range of expected frequencies. A suitable analog-to-digital converter ADC is the 574 AKD manufactured by Hybrid Systems, Inc., Billerica, Mass. 01821.

The output of the analog-to-digital converter ADC is provided to a multi-wire output bus B which connects to the processing section shown in FIG. 3B.

The processing section includes a microprocessor MP and associated read only memory (ROM), an output register R, and a controller CTR. The microprocessor MP includes the usual arithmetic logic unit (ALU), an on-chip random access memory RAM, one or more working registers, and an external crystal XTL that controls the execution cycle. A suitable microprocessor MP is the TMS 32010 manufactured by Texas Instruments, Inc., of Dallas, Tex. 75222.

The read-only memory ROM contains a stored program for controlling the operation of the microprocessor MP, as described more fully below, and the random access memory RAM contains memory locations for the temporary storage of the digital values representing various intermediate and final computational results. While various general purpose memories are suitable for the intended purpose, model 2732A EPROM memories by the Intel Corp., Santa Clara, Calif. 95051 are suitable. If desired, the ROM memory can also be incorporated as an integral on-chip element of the microprocessor MP.

The microprocessor MP receives a synchronization signal "SYNC" from a synchronization circuit that includes a zero-crossing detector that detects the zero crossing of the AC power waveform and provides a zero crossing signal to the microcomputer to indicate a time window along the AC power waveform when the speed representative voltage signal $V_m$ from the sensing resistor $R_s$ will be most visible. One suitable time window occurs during that portion of the downward slope following the maxima of each positive alternation of the power waveform. The use of a synchronization circuit provides a higher probability of valid signals being utilized to enhance the reliability of the speed measuring function. As shown in FIG. 3A, the SYNC circuit includes a voltage divider arrangement that includes resistors $R_{10}$ and $R_{11}$ and diodes $D_1$ and $D_2$ with this circuit connected through a resistor $R_{12}$ to the inverting input of a voltage comparator $A_4$ with hysteresis controlled in the usual manner through resistors $R_{13}$, $R_{14}$, and $R_{15}$. One suitable voltage comparator is the LM393 manufactured by the National Semiconductor Company of Santa Clara, Calif. 95051.

In operation, the microprocessor MP functions in accordance with the stored program in the read-only memory ROM to perform a Fourier transform on the digital output of the analog-to-digital converter ADC by which the output of the motor is resolved into sine and cosine terms, constants, and coefficients by which the amplitude spectral content may be quantified in a discrete manner.

The output of the microprocessor MP, which is a multi-bit binary number representative of the speed of the motor M, is presented to and held in the register R. The speed representative number is updated once each computational cycle, as described more fully below, and is available to the controller CTR for use in effecting speed control of the motor. The controller CTR, in addition, can receive a speed command from a trigger-type switch T, an increment-decrement switch SW, a keypad KP, or the like. The signal output of the controller CTR is provided to the gate of the thyrister Th to effect desired motor control. The controller CTR can take one of several forms including a one-chip microcomputer such as the MC146805G2 microcomputer manufactured by Motorola Semiconductor Products, Inc., Phoenix, Ariz. 85036.

In addition, the controller CTR can receive a calibration and test input "TACH" through an operational amplifier $A_5$, functioning as a buffer.

In performing the Fourier transform, various computational algorithms are suitable. In the preferred embodiment, the stored program controls the microprocessor MP to perform a "butterfly" transform by which four input numbers (A, B, C, and D) are used to compute four output numbers (A', B', C', and D') in accordance with the following "butterfly" formulas.

$A' = A + B + C + D$
$B' = (A - jB - C + jD)W^k$
$C' = (A - B + C - D)W^{2K}$
$D' = (A + jB - C - jD)W^{3k}$
$W = e^{-j\pi}$
$J = \sqrt{-1}$ The microprocessor performs a 64 point FFT transform by which 16 such transformations are performed in each of three computational passes. Each pass begins with 64 complex numbers stored in locations numbered 0-63 in the memory RAM and concludes with a new set of numbers stored in the same way; the output of the first computational pass then becomes the input for the next computational pass.

In the first pass there are 16 butterfly transformations numbered from 0-15. The value of K is equal to the butterfly index (n) divided by 32.

Pass 1 Butterflies

For butterfly number n
where n=0, 1, 2, . . . , 15
    A comes from input position 0+n
    B comes from input position 16+n
    C comes from input position 32+n
    D comes from input position 48+n
    A' goes to output position 0+n
    B' goes to output position 16+n
    C' goes to output position 32+n
    D' goes to output position 48+n In pass two, four groups of four transforms are performed. The first group operates on the first 16 numbers (locations 0 to 15), the second group works on the second 16 numbers (locations 16 to 31), etc. For this pass, a group number is assigned n=0 to 3. In each group the butterfly index number n=0 to 3. Also for this pass, the value of K is equal to the butterfly index number divided by 8 (k=n/8).

Pass 2 butterflies

For butterfly group g number n
where g=0, 1, 2, 3 and n=0, 1, 2, 3
    A comes from input position number 16*g+0+n
    B comes from input position number 16*g+4+n
    C comes from input position 16*g+8+n
    D comes from input position 16*g+12+n
    A' goes to output position 16*g+0+n
    B' goes to output position 16*g+4+n
    C' goes to output position 16*g+8+n
    D' goes to output position 16*g+12+n In the third and final pass, sixteen individual butterfly transforms are performed. For this pass the butterfly index number is always 0, and the group number g=0 to 15. Also, k is always 0.

Pass 3 Butterflies

For butterfly group g
where g=0, 1, 2, . . . , 15
    A comes from input position number 4*g+0
    B comes from input position number 4*g+1
    C comes from input position number 4*g+2
    D comes from input position number 4*g+3
    A' goes to output position number 4*g+0
    B' goes to output position number 4*g+1
    C' goes to output position number 4*g+2
    D' goes to output position number 4*g+3

Data Reordering

The output of the third and final pass is not in the order required for the final results. It is therefore necessary to rearrange the data before it is used. The algorithm for this is shown in the following table.

Final Reordering Algorithm

Set value of index i to 0.
For index r=0 to 3 perform the following.
For index s=0 to 3 perform the following.
For index t=0 to 3 perform the following.
    Move input location 16*t+4*s+r to output location i. Add 1 to index i.

The nature and characteristic of the above transform is described in detail in publication AM29500 by Advanced Micro Devices of Sunnyvale, Calif. 94086 (1982) and in Elliot, D. F. and Rao, K. R., *Fast Transforms, Algorithms, Analyses, Applications*, Academic Press (N.Y.) 1982, pp. 58 et seq.

Figure 4:
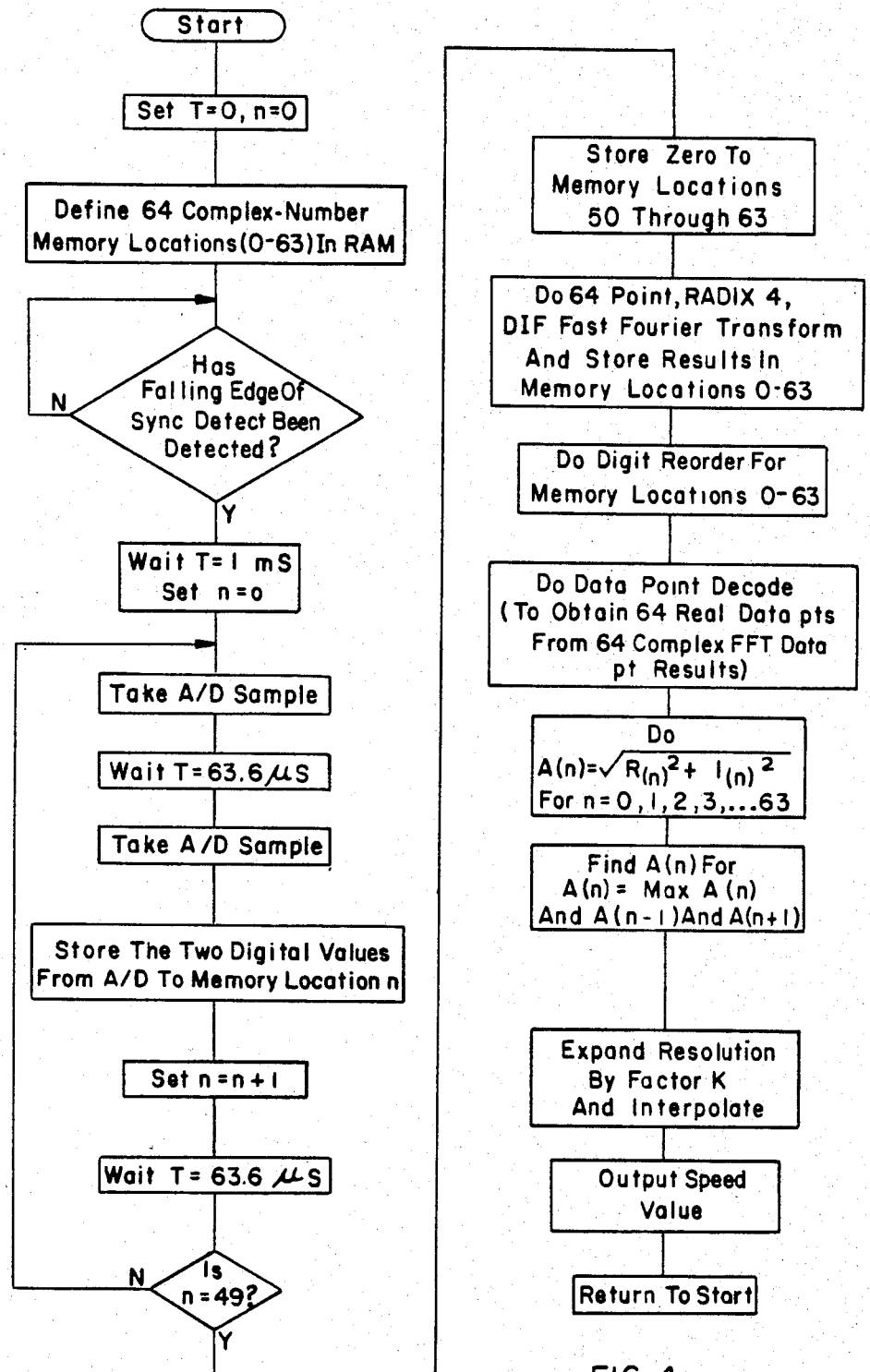
FIG. 4 is a flow diagram of a control program for effecting the desired fast Fourier transform analysis.

The above-described transform is implemented in accordance with the flow diagram of FIG. 4. As shown therein, the microprocessor MP is initialized by setting T=0 and n=0 and defining 64 complex-number memory locations (0-63) in the memory RAM. As described above in relationship to FIG. 3B, the RAM memory can be located on the microprocessor. The complex-number memory of locations include locations for the real part and the imaginary part of each complex number. Thereafter a query is executed to determine if the falling edge of the sync detect, provided by sync detect 22 of FIG. 2, has been detected. Where the falling edge has not been detected, the program sequence loops about this query. Upon detection of the falling edge of the synchronization detect from the "SYNC" circuit (FIG. 3A) and an appropriate waiting period, such as 1 ms., a first sample is taken by the A/D converter ADC (FIG. 3A), a waiting period of approximately 63.6 $\mu s$ is allowed to elapse and a second sample taken by the A/D converter. The samples are then stored in the first memory location (n=0). The counter n is incremented, a similar waiting period (63.6 $\mu s$) is allowed to elapse, and a query executed to determine is the upper limit for n (in this case 49) has been reached. If not, the storage procedure is continued until 50 storage locations have been filled. Thereafter, the remaining memory locations (50 to 63) are set to zero. A 64 point, radix 4, fast Fourier transform is then performed in accordance with the transform equations and the multiple butterfly pass technique discussed above and described in detail in the above mentioned publication. Thereafter, the digits are reordered in the memory locations as outlined above and the output data is decoded to obtain 64 real data points from 64 complex fast Fourier transform data points. The real and imaginary parts of the numbers are analyzed in a DO sequence using the equation: $A(n) = \sqrt{R_{(n)}^2 + I_{(n)}^2}$ for n=0−63 to obtain the amplitude spectra, and the maximum amplitude value A(n) and its adjacent values A(n+1) and A(n−1) determined. The resolution is expanded by a factor K (e.g., 4) to determine the desired speed value output.

In accordance with one feature of the invention, computation efficiency is increased by using the imaginary components of the complex number pairs to represent real numbers and thereby increase resolution. When the analog-to-digital conversion is performed, two real numbers are sorted into each complex memory location, representing two points on the time-domain analog curve, instead of one complex number representation (C=R+Ij). Thus, 128 values can be loaded into input (resulting in 64 real data points at output). The 128 values are represented by 100 ADC readings plus 28 zeros (14 complex memory locations, with two zero values for each memory location) as illustrated by the instruction sequence on the left side of FIG. 4.

The present invention provides a speed sensor that is indirect, that is, it does not require discrete speed pick-off transducers such as the photoelectric or magnetic pick-offs and associated apertured or toothed wheels typically employed in the past. By utilizing a microprocessor controlled device that effects fast Fourier transform, it is possible to provide an accuracy of 1% over a speed range from 10 to 35 thousand rpm. Since the circuit devices of the disclosed embodiments are amenable to integrated circuit fabrication techniques, it is possible to provide an indirect speed sensor having a low piece-part count, and low fabrication costs with high accuracy.

As will be apparent to those skilled in the art, various changes and modifications may be made to the indirect speed sensing apparatus and method of the present invention without departing from the spirit and scope of the invention as recited in the appended claims and their legal equivalent.

We claim:

1. An apparatus for sensing the operating speed of an electric motor of the type that causes recurring current variations through its windings as a function of its speed, said apparatus comprising:
    impedance means for connection to an electric motor circuit for providing an electrical signal output that varies with speed-dependent variations of the current in the electric motor circuit;
    converting means coupled to said impedance means for converting said electrical signal output to digital values representative of the corresponding value of the electrical signal;
    stored-program controlled means coupled to said converting means for performing a Fourier transform upon said digital values to obtain an amplitude spectrum of said speed-dependent electrical signal and for identifying a maximum amplitude spectral component therein;
    utilizing means connected to the output of said stored-program controlled means for utilizing the so-identified maximum amplitude spectral component as representative of the motor's speed;
    filter means interposed in between said impedance means and said converting means for passing frequencies in a pass band expected for the range of motor speeds; and
    said filter means comprising a plurality of cascaded switched capacitor filters.

2. The apparatus claimed in claim 1 further comprising:
    amplifier means associated with said filter means to compensate for signal attenuation caused by said filters.

3. An apparatus for sensing the operating speed of an electric motor of the type that causes recurring current variations through its windings as a function of its speed, said apparatus comprising:
    impedance means for connection to an electric motor circuit for providing an electrical signal output that varies with speed-dependent variations of the current in the electric motor circuit;
    converting means coupled to said impedance means for converting said electrical signal output to digital values representative of the corresponding value of the electrical signal;
    stored-program controlled means coupled to said converting means for performing a Fourier transform upon said digital values to obtain an amplitude spectrum of said electrical signal and for identifying a maximum amplitude spectral component therein;
    utilizing means connected to the output of said stored-program controlled means for utilizing the so-identified maximum amplitude spectral component as representative of the motor's speed;
    enabling means for connection to and responsive to an alternating supply current waveform to provide an enabling signal to said stored-program controlled means to effect said transformation during a selected portion of the AC waveform; and
    said enabling means comprising a zero-crossing detector.

4. An apparatus for sensing the operating speed of an electric motor of the type that causes recurring current variations through its windings as a function of its speed, said apparatus comprising:
    means coupled to a motor circuit for sensing speed-dependent current variations therein and for providing corresponding digital values;
    memory controlled processor means connected to said first-mentioned means for performing a Fourier transform upon said digital values to obtain an amplitude spectrum of said electrical signal and for identifying a maximum amplitude spectral component therein;
    utilizing means connected to said memory controlled processor means for utilizing the so-identified maximum amplitude spectral component as an indication of motor speed;
    means for connection to and responsive to an alternating supply current waveform to provide an enabling signal to said memory controlled processor means to effect said transformation during a selected portion of the AC waveform; and
    said enabling means comprising a zero-crossing detector.

* * * * *